Figure 1:
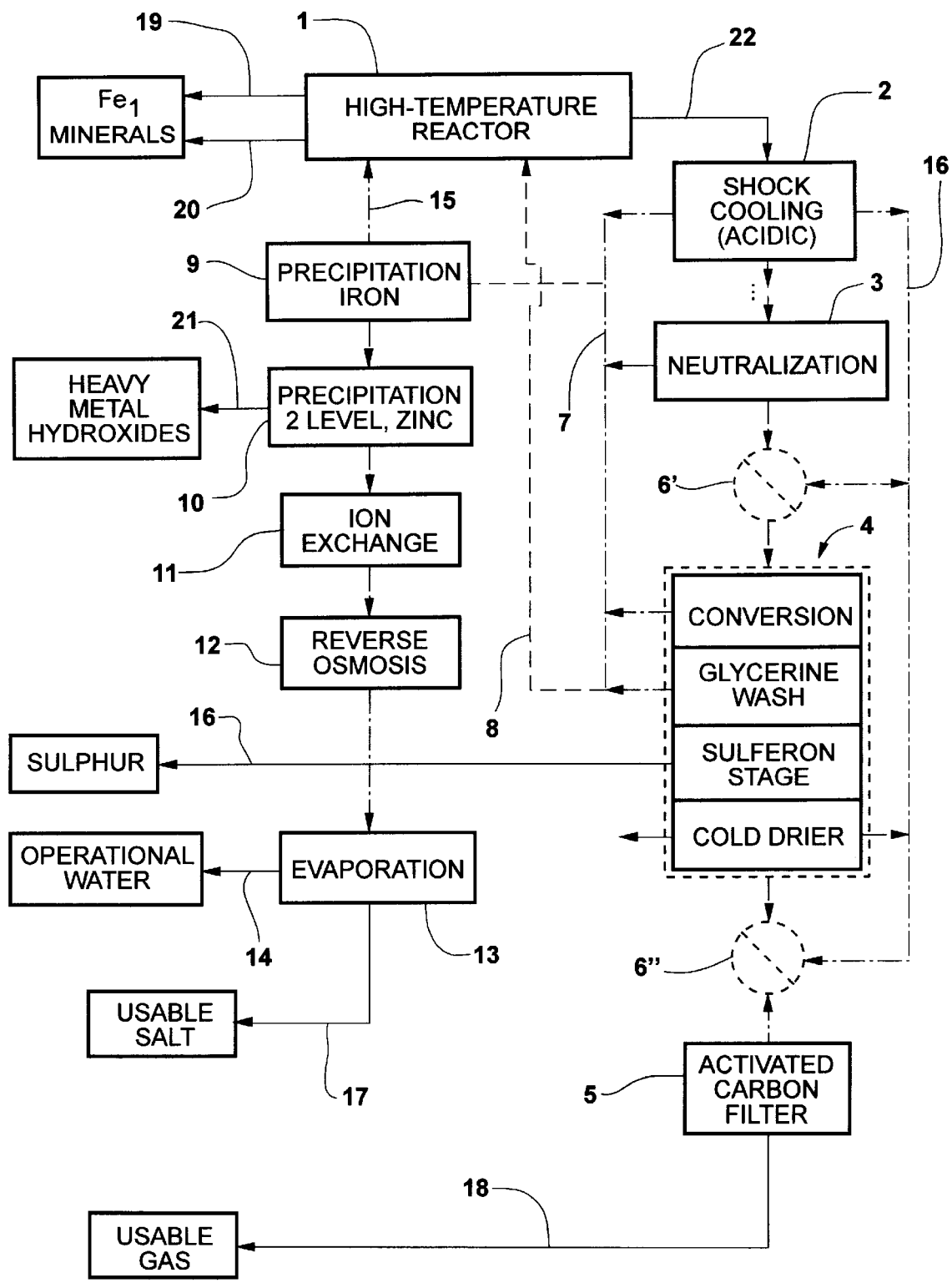

United States Patent [19]

Kiss

[11] Patent Number: 6,068,793
[45] Date of Patent: May 30, 2000

[54] METHOD FOR TOTAL MATERIAL, EMISSION-FREE UTILIZATION BY HIGH-TEMPERATURE RECYCLING AND BY FRACTIONAL MATERIAL-SPECIFIC CONVERSION OF THE RESULTANT SYNTHESIS RAW GAS

[75] Inventor: Günter H. Kiss, Minusio, Switzerland

[73] Assignee: Thermoselect AG, Liechtenstein, Germany

[21] Appl. No.: 08/959,907

[22] Filed: Oct. 29, 1997

[30] Foreign Application Priority Data

| Oct. 29, 1996 | [DE] | Germany | 196 44 964 |
| May 15, 1997 | [DE] | Germany | 197 20 450 |
| Jul. 11, 1997 | [DE] | Germany | 197 29 816 |
| Aug. 12, 1997 | [DE] | Germany | 197 34 911 |

[51] Int. Cl.$^7$ .............................. C07C 1/02; C01B 21/00
[52] U.S. Cl. .......................................... 252/373; 423/235
[58] Field of Search ................... 252/373; 423/210, 423/242.1, 244.01, 244.09, 246, 247, 248, 215.5; 95/223, 224, 230, 228, 237, 901, 45, 48, 235, 236

[56] References Cited

U.S. PATENT DOCUMENTS

| 3,970,524 | 7/1976 | Funk | 201/2.5 |
| 4,402,709 | 9/1983 | Stellacio | 48/197 |

FOREIGN PATENT DOCUMENTS

| 0742039 | 11/1996 | European Pat. Off. . |
| 4130416 | 12/1992 | Germany . |
| 4420449 | 5/1996 | Germany . |

Primary Examiner—Steven P. Griffin
Assistant Examiner—Maribel Medina
Attorney, Agent, or Firm—Howard & Howard

[57] ABSTRACT

The invention relates to a method and the devices for emission-free total material utilisation of all the ingredients of community or industrial wastes of all types by gasification at high temperatures and processing of the resulting synthesis raw gas, whereby by fractional conversion of all the main ingredients such as hydrogen, carbon monoxide and carbon dioxide, and also the ingredients water, heavy metals, sulphur, chlorine and sodium may be supplied for re-use as a raw material.

19 Claims, 1 Drawing Sheet

METHOD FOR TOTAL MATERIAL, EMISSION-FREE UTILIZATION BY HIGH-TEMPERATURE RECYCLING AND BY FRACTIONAL MATERIAL-SPECIFIC CONVERSION OF THE RESULTANT SYNTHESIS RAW GAS

The invention relates to a method of recovery of usable materials, or rendering them useful, from synthesis raw gas, which occurs during the gasification of community or other wastes, preferably also for toxic and special waste of any type, according to the preamble to claim 1, and to a device for carrying out the method.

Gasification of waste is becoming increasingly important as a method for thermal waste treatment, above all because of its great potential for destroying toxins. In addition, the synthesis gas is obtained as a thermally or chemically usable material, and also Fe metals and vitrified minerals, occur in a directly usable form. However the synthesis raw gas also still contains heavy metals, chlorine and sulphur. These design the gasification of waste as being free of dumpable residual materials. A further object of the invention is to exclude stress on the environment due to waste water. Finally it is also an object of the invention to indicate a device for carrying out the method according to the invention. As regards the method, this object is achieved by the characterising part of claim 1 and the sub-claims indicate advantageous further developments thereof. As regards the device, claim 11 indicates the solution with advantageous further developments in the sub-claims.

By the staged conversion of the contents appearing as harmful materials in the synthesis raw gas into usable materials in separate, separately heated wet-treatment stages, the condition is satisfied for the recovery of the materials, the conversion, i.e. the transfer of the materials into a recoverable form, in separate, separately heatable wet-treatment stages, enabling conversion conditions adapted to optimum specific contained materials. The temperature of the treatment stages is in this case more appropriately predetermined by the staged condensation, necessary for the partial separation, of the water vapour contained in the synthesis raw gas. The contained materials converted into usable materials from the separate conversion stages are then recovered such that the solutions and condensates of the different conversion stages are brought together and subjected in common to successively staged precipitation reactions and ion-exchange processes, with recovery of the process water. A subsequent cold drying of the synthesis gas cleaned of the undesirable ingredients removes the residual moisture which then, together with the covered process water, is again passed to the individual conversion stages, so that an enclosed lower process water circuit results. Thus, by virtue of the fact that firstly during cleaning of the synthesis raw gas, its ingredients are not only separated, but are converted before separation into a form which is directly re-usable after separation, the condition is satisfied for a residue-free synthesis gas cleaning, and also in that the process water and the condensates of the conversion stages are subjected in common to staged precipitation and ion exchange reactions, this providing a simple possibility of recovering the useful materials, as their reactions in the conversion stages and the type of precipitation and ion-exchange reaction can be designed to be co-ordinated with one another.

Ingredients of the synthesis raw gas can if necessary be directly separated, i.e. without conversion, which then only comes under the sense of the inventive idea if the ingredient is industrially usable in this form.

It can therefore be advantageous to dispose a catalytically-acting separately-operated separation stage in the flow path of the synthesis raw gas.

Such a possible separation exists for example for sulphur, which may be separated as an element with the aid of the catalytically-acting so-called "Sulferox" method, and in this form is a material which is usable in many areas.

Preceding cleaning of the synthesis raw gas in the present state of the art there is usually a shock-type cooling directly after it leaves the high-temperature reactor, in order to suppress a "de-novo" synthesis of organic harmful materials. In this case the synthesis raw gas flows through a water spray. According to the invention, this water spray, the so-called "quench" can be used as the first conversion stage, in that it is operated as a spray quench in the pH range of <5, i.e. in the acidic range. Thus hydrogen chloride and heavy metals are converted into recoverable chlorides. After the acidic spray quench the synthesis raw gas passes through a neutralising, basically-adjusted wet-treated stage. During this passage its temperature is optimally adjusted for the subsequent specific conversion stages. Thus a plurality of advantages arise:

The waver vapour contained in the synthesis raw gas is condensed in the quench and does not prevent following conversions;

The water carried out of the spray quench is held back in the neutralising stage and is usable again due to the neutralisation;

The synthesis raw gas enters subsequent treatment stages at an optimum temperature, so that at that point the reactions are improved and accelerated.

It is particularly advantageous if the synthesis raw gas thus heated subsequently passes through several conversion stages, which are disposed in a common container which is however subdivided in accordance with the stages provided. Such an arrangement is described for example in EP 95 10 6932.7 under the name "combination washer". Within this combination washer, a dust removal stage can more appropriately be disposed, more advantageously with a dust removal agent of a greater viscosity than water, for example glycerine. The dust-removal agent is thus freed of dust and regenerated in its own circuit, the dust is returned to the high-temperature reactor and at that point again participates in the gasification reaction.

Thus the conversion, associated with the flow path of the synthesis gas, of the noxious elements contained therein, into recoverable useful materials, and their transfer into the waters of the various conversion stages, is terminated. The synthesis gas cleaned in this way of undesirable mixtures can, if necessary after an additional cold drying to remove any remaining residual moisture, after renewed heating of the dry synthesis gas with subsequent passage through an activated carbon filter, be returned for material and/or thermal utilisation. The cold drying can be effected in a separate treatment stage. It is advantageous to integrate this stage into the combination converter. The waste heat from this stage and from the spray quench can be de-coupled if required and used to equalise the temperature of the conversion stages, and to heat the gas.

The solutions and condensates of the conversion and cooling stages, which the usable materials to be recovered contain in solution, possibly also in dispersion, are brought together and further treated in common. Firstly, iron and heavy metals such as lead and zinc are separated in a staged hydroxide precipitation. The precipitated iron compounds from the first precipitation stage are more advantageously returned to the high-temperature reactor, are there melted down and removed as a usable metallic granulate. The mixed precipitations of the subsequent precipitation stages contain the other heavy metals and, processed into a concentrate, are a usable material capable of smelting.

The solution flowing from the hydroxide precipitations predominantly contains alkali chlorides. The residual portion of the calcium ions is precipitated by the introduction of carbon dioxide as calcium carbonate and likewise returned to the high-temperature reactor for melting down. The disruptive calcium ions still remaining, which are present in a small proportion, and which would contaminate the alkali chloride usable salt, are removed in an ion exchanger. The alkali chloride solution thus cleaned is concentrated. For this purpose, more advantageously the solution is subjected to reverse osmosis. Finally, there is obtained in a crystallisation evaporator a mixed salt of use as a raw material and a condensate are obtained, which can be optionally used as operational water. Thus, by means of the method according to the invention, both the material utilisation of all gases, vapours and dusts leaving the high-temperature reactor and also total freedom from waste water are guaranteed.

A device preferably used for carrying out the method according to the invention according to claims 1 to 10 comprises a flow path for the synthesis gas, a recovery path for the converted usable materials and return devices to the high-temperature reactor and to the conversion stages. In this respect the flow path for the synthesis gas comprises at least after-treatment stages for shock cooling with a pH value of <5, neutralisation with a pH value of >8 and a combination converter, which if necessary includes further wet-treatment stages for conversion into recoverable usable materials, a glycerine dust wash, a Sulferox wash and a cold drying stage. The combination converter is then followed by a gas heating system and an activated carbon filter. In the sequence indicated, the synthesis raw gas flows through the flow path of the device and emerges as a high-purity thermally and/or materially usable synthesis gas. The recovery path, which serves to recover the converted usable materials, comprises at least the reaction stages hydroxide precipitation for iron, hydroxide precipitation for other heavy metals, carbon dioxide precipitation and ion-exchanger for calcium, reverse osmosis and crystallisation evaporation, through which the water laden with usable materials coming from the shock cooling passes in common through neutralisation and the conversion stages, after it has been collected and passed to the recovery path via the first hydroxide precipitation. The respective reaction stages of the recovery path have removal devices for the usable materials sulphur, heavy metal hydroxides, usable salt and usable gas, and return devices to the high-temperature reactor for the separated iron hydroxide and the dusts from the glycerine wash. The process water remaining after recovery of the usable materials is available as raw material water for optional use.

By means of a heat-coupling between shock cooling, gas temperature equalisation, cold drying and tempering of the conversion stages, the overall efficiency of the device can be improved, and for this purpose can have corresponding heat exchangers, and if necessary also heat pumps.

The invention will be described in more detail with reference to the FIGURE.

In this FIGURE, the number 1 indicates the high-temperature reactor, which as for example described in P 41 30 416, is operated as a melt-out reactor and has the outlets 19 and 20 for Fe and its alloy metals and the minerals which have been rendered inert, and the gas outlet 22 for the synthesis raw gas, which is passed into the spray quench 2. In this spray quench 2, which is operated in the pH range <5, i.e. in the acidic range, conversion of the ingredients begins, above all of Cl, Pb, Zn and Fe carried along. Simultaneously there takes place the shock-like re-cooling of the synthesis raw gas in order to prevent reformation of organic toxic materials (dioxins, furanes). Thereafter the synthesis raw gas is passed into the neutralisation bath 3 which, at a pH value of >8, neutralises the raw gas moisture. The pH value conditions in the spray quench 2 and in the neutralisation bath 3 are co-ordinated with one another; they are more appropriately continuously measured and adapted. After any necessary renewed gas heating 6', which is predetermined by the reactor conditions of the mixed conversion stage, the synthesis raw gas passes into the combination converter 4, which, in addition to one or a plurality of conversion stages, has a glycerine wash for dust removal, a Sulferox stage for catalytic separation of sulphur and a stage for cold drying. The sulphur, in a form usable as a useful material, is removed through the outlet 16 directly from the Sulferox stage which is operated separately from the other (wet) conversion stages. The glycerine wash has for the separated dusts the outlet 8, by means of which the dusts which could be charged with noxious materials in an adsorbent manner, are returned for renewed high-temperature treatment in the reactor 1. After the cold-drying, the synthesis raw gas is heated (heating 6") and, after passing through the activated carbon filter, leaves the device through the outlet 18 as a high-purity synthesis gas. A preferred embodiment here proposes to house the activated carbon filter in exchangeable cassettes through which gas can flow. In this way a simple exchange is possible, and the return of the activated carbon into the high-temperature reactor. The cassette can then be reused. The heat sources and sinks (6, 6', 6", cold drying) located in the described flow path are thus thermally coupled with the aid of suitable elements such as heat exchangers and heat pumps, as symbolised by the number 16 and the directional arrows. The process water from the spray quench 2, neutralisation 3 and the combination converter 4 is collected and passed by means of the pipe system 7 to the first hydroxide precipitation 9. The iron hydroxide separated here is returned via the outlet 15 into the high-temperature reactor 1 and there melted down. Thereafter the collected process water passes through a second hydroxide precipitation 10, in which lead and zinc hydroxides are precipitated in common and are removed through the outlet 21 as a mixture. This mixture is known in technology to be usable as raw and useful material capable of smelting.

In supplementation of the method procedure described, it is also possible, after the second hydroxide precipitation, to interpose an additional precipitation with $CO_2$ and to precipitate out any calcium ions present. Thereafter the process water contains mainly sodium and potassium chlorides, which as a usable material may only be slightly contaminated with calcium. These calcium impurities are removed in the ion-exchanger 11 and the alkali chlorides are concentrated in the reverse osmosis stage 12, before they are obtained as a usable salt in the crystallisation evaporator 13 and removed through the outlet 17. The process water is thus freed of its ingredients and can be optionally used, together with the condensate from the cold dryer as operational water. The process is free of waste water.

The FIGURE shows that when the inventive idea is used, gasification of waste is not only free of emission of toxic materials, but also can be carried out with total utilisation of the energy and material contents of the waste, without the occurrence of dumped residual material and without environmental stress due to waste water.

By means of the high-temperature recycling method proposed here, wastes of varying origins and compositions are totally transformed into re-usable materials, i.e. into mineral granulate, iron metal alloy, synthesis gas, distilled water, elementary sulphur, salt mixture capable of electrolysis, and zinc and lead concentrate

What is claimed is:

1. A method for a total material and emission-free utilization of a synthesis raw gas comprising water vapour and harmful substances, the synthesis raw gas being obtained during a high temperature recycling of all components of community or industrial wastes, comprising:

a) staged separation and conversion of the harmful substances into a recoverable form and staged condensation of the water vapour in individual and separately heated wet-treatment stages to form a synthesis clean gas;

b) combination of condensates and solutions obtained in the individual wet-treatment stages and containing the converted substances;

c) staged separation of the substances combined in step b) and recovery of process water by one of separation, precipitation and ion-exchange reactions;

d) cooling the synthesis clean gas to form a condensate; and e) returning the process water recovered in step c) and the condensate formed in step d) to the individual wet-treatment stages of step a).

2. The method according to claim 1, wherein the synthesis raw gas is treated in at least one catalytically-acting and separately-operable separation stage disposed in a flow path of the synthesis raw gas.

3. The method according to claim 1, wherein step a) comprises a shock cooling.

4. The method according to claim 3, wherein the shock cooling is a spray quench operated in a pH range of <5 for converting hydrogen chloride and heavy metals contained in the synthesis raw gas into recoverable chlorides.

5. The method according to claim 4, wherein step a) further comprises a neutralisation adjusted to be basic and conducted after the shock cooling.

6. The method according to claim 3, wherein a heat recover is associated with the shock cooling, a heat recovered by the heat recover at least partly being used for heating the synthesis raw gas and and the wet-treatment stages.

7. The method according to claim 6, wherein the heat recovered by the heat recover is further used for heating the synthesis raw gas prior to passing an activated carbon filter disposed in a flow path of the synthesis raw gas.

8. The method according to claim 1, wherein step a) comprises a neutralisation.

9. The method according to claim 8, wherein the neutralisation is adjusted to be basic.

10. The method according to claim 8, wherein during the neutralisation a temperature of the synthesis raw gas is adjusted for subsequent separation and conversion stages.

11. The method according to claim 1, wherein only step a) at least partly or step a) at least partly together with one or more of steps b), c), and d) are conducted in a common and sub-divided container acting as a combination converter, the synthesis raw gas flowing through the combination converter at an essentially constant temperature.

12. The method according to claim 11 including separating particles in the combination converter for return to a gasification reaction of the high-temperature recycling.

13. The method according to claim 12, wherein the particle separation is conducted by means of an additive, the additive being freed of particles and regenerated in a separate circuit.

14. The method according to claim 1 including high-temperature recycling of waste to produce the substances of step a) and returning products of one of steps a), b), c) and d) to the high-temperature recycling.

15. The method according to claim 1, wherein, in step c), iron and other heavy metals are recovered successively from the combined solutions and condensates by an hydroxide precipitation comprising at least two precipitation stages.

16. The method according to claim 15, wherein a solution flowing from the hydroxide precipitation and containing alkali chlorides is freed from contaminating calcium ions in an ion exchanger.

17. The method according to claim 16, wherein the solution purified in the ion exchanger is concentrated by reverse osmosis.

18. The method according to claim 17, wherein the solution concentrated by reverse osmosis is treated in a crystallisation evaporator to form a mixed salt usable as a raw material and a condensate usable as a process water.

19. The method according to claim 15, wherein hydoxides of heavy metals other than iron precipitated in a second or a further stage and forming a smeltable granulate are used directly as a raw or useful material.

* * * * *